United States Patent
Brodsky et al.

[11] Patent Number: 5,960,199
[45] Date of Patent: Sep. 28, 1999

[54] MODEL TRACE VIEW FOR OBJECT-ORIENTED SYSTEMS

[75] Inventors: Stephen Andrew Brodsky, Los Gatos; Gary Charles Doney, Sunnyvale; Michael Morris Golding, Palo Alto; Hsin-Liang Huang, San Jose; Rebecca Mei-Har Lau, San Jose; Shu Jung Wang, San Jose, all of Calif.

[73] Assignee: International Business Machines Corporation, Armonk, N.Y.

[21] Appl. No.: 08/850,838

[22] Filed: May 2, 1997

Related U.S. Application Data

[63] Continuation-in-part of application No. 08/747,415, Nov. 12, 1996, Pat. No. 5,893,913, which is a continuation-in-part of application No. 08/747,414, Nov. 12, 1996, which is a continuation-in-part of application No. 08/747,057, Nov. 12, 1996, Pat. No. 5,907,706, which is a continuation-in-part of application No. 08/747,058, Nov. 12, 1996, which is a continuation-in-part of application No. 08/747,417, Nov. 12, 1996, and a continuation-in-part of application No. 08/747,416, Nov. 12, 1996, Pat. No. 5,917,498.

[51] Int. Cl.⁶ .................................................. G06F 17/30
[52] U.S. Cl. .......................... 395/704; 395/712; 395/702; 395/561; 707/1; 707/10; 707/103; 345/352; 345/507
[58] Field of Search ................................. 707/1, 10, 103; 356/346; 358/299; 359/183.14, 365, 631, 670; 382/207; 395/712, 102, 704, 702, 561; 364/146

[56] References Cited

U.S. PATENT DOCUMENTS

| | | | |
|---|---|---|---|
| 5,247,651 | 9/1993 | Clarisse | 395/500 |
| 5,257,363 | 10/1993 | Shapiro et al. | 395/500 |
| 5,495,607 | 2/1996 | Pisello | 707/10 |
| 5,517,606 | 5/1996 | Matheny | 395/156 |
| 5,557,793 | 9/1996 | Koerber | 707/103 |
| 5,581,755 | 12/1996 | Koerber | 364/268 |
| 5,590,330 | 12/1996 | Coskun | 395/704 |
| 5,740,440 | 4/1998 | West | 395/704 |
| 5,778,230 | 7/1998 | Wimble | 395/704 |
| 5,867,713 | 2/1999 | Shrader | 395/712 |
| 5,870,606 | 2/1999 | Lindsey | 395/704 |
| 5,870,611 | 2/1999 | Shrader | 395/712 |

OTHER PUBLICATIONS

Citrin, W. et al., "Using Formalized Temporal Message–flow Diagrams", Software—Practice and Experience, Dec. 1995, vol. 25(12), pp. 1367–1401.

Coats, M., et al., "Constructing Operational Specifications", Dr. Dobb's Journal, Jun. 1995, pp. 18–33.

*Primary Examiner*—Thomas G. Black
*Assistant Examiner*—Diane D. Mizrahi
*Attorney, Agent, or Firm*—Gates & Cooper

[57] ABSTRACT

The present invention discloses a method, apparatus, and article of manufacture of an object-oriented tool for displaying, within one window of a monitor connected to a computer, both a graphical and textual trace of an object-oriented model during execution. The invention has three sections, an object/operation/argument selection section, a graphical trace section, and a textual trace section. The object selection section displays a list of all available objects. The graphical trace view displays a graphic of the objects passing operations back and forth. The textual trace displays a log of activity during execution.

51 Claims, 8 Drawing Sheets

MODEL TRACE VIEW FOR OBJECT-ORIENTED SYSTEMS

CROSS-REFERENCE TO RELATED APPLICATIONS

This application is a continuation-in-part of the following co-pending and commonly-assigned patent applications:

application Ser. No. 08/747,415, entitled "METHOD FOR SYNCHRONIZING CLASSES, OBJECTS, ATTRIBUTES AND OBJECT PROPERTIES ACROSS AN OBJECT-ORIENTED SYSTEM," filed on Nov. 12, 1996, now U.S. Pat. No. 5,893,913 by Stephen A. Brodsky et al.;

pending application Ser. No. 08/747,414, entitled "LAYOUT METHOD FOR ARC-DOMINATED LABELLED GRAPHS," filed on Nov. 12, 1996, by Dipayan Gangopadhyay, et al.;

application Ser. No. 08/747,416, entitled "MULTI-OBJECT VIEWS IN AN OBJECT MODELING TOOL," filed on Nov. 12, 1996, now U.S. Pat. No. 5,917,498 by Roni Korenshtein;

application Ser. No. 08/747,057, entitled "INTERACTIVE MODELING AGENT FOR AN OBJECT-ORIENTED SYSTEM," filed on Nov. 12, 1996, now U.S. Pat. No. 5,907,706 by Stephen A. Brodsky et al.;

pending application Ser. No. 08/747,058, entitled "EXECUTION ENGINE IN AN OBJECT MODELING TOOL," filed on Nov. 12, 1996, by Stephen A. Brodsky et al.;

pending application Ser. No. 08/747,417, entitled "NOTIFICATION MANAGER FOR OBJECT-ORIENTED SYSTEMS," filed on Nov. 12, 1996, by Stephen A. Brodsky et al.;

all of which applications are incorporated by reference herein.

This application is also related to the following co-pending and commonly-assigned patent applications:

pending application Ser. No. 08/850,829, entitled "METHOD FOR SYNCHRONIZATION BETWEEN LINKS AND GROUP DEFINITIONS WITHIN AN OBJECT-ORIENTED SYSTEM," filed on same date herewith, by Stephen A. Brodsky et al.;

pending application Ser. No. 08/850,858, entitled "OBJECT OUTLINE VIEW FOR GROUPS WITHIN AN OBJECT-ORIENTED SYSTEM," filed on same date herewith, by Stephen A. Brodsky, et al.;

pending application Ser. No. 08/850,214, entitled "METHOD FOR SENDING A MESSAGE TO A GROUP AND THE GROUP BROADCASTS THE MESSAGE TO ITS MEMBERS OR REFERENCES WITHIN AN OBJECT-ORIENTED SYSTEM," filed on same date herewith, by Stephen A. Brodsky et al.;

pending application Ser. No. 08/850,832, entitled "CHANGE AND ACCOUNTING LOG FOR OBJECT-ORIENTED SYSTEMS," filed on same date herewith, by Stephen A. Brodsky et al.;

pending application Ser. No. 08/850,837, entitled "FRACTAL NESTED LAYOUT FOR HIERARCHICAL SYSTEMS," filed on same date herewith, by Stephen A. Brodsky;

pending application Ser. No. 08/850,847, entitled "REFERENCE ATTRIBUTES WITHIN AN OBJECT-ORIENTED SYSTEM," filed on same date herewith, by Stephen A. Brodsky et al.;

all of which applications are incorporated by reference herein.

BACKGROUND OF THE INVENTION

1. Field of the Invention

This invention relates generally to object-oriented systems, and in particular to a model trace view for object-oriented systems.

2. Description of Related Art

To identify problems in a program, programmers typically use a debugger program that creates a record of the program's execution. This record usually consists of only a textual trace which displays events that transpire during execution. For example, the textual trace displays messages that pass back and forth between program functions and/or applications.

In the case of a complex program that has many functions, the textual trace can be confusing. It fails to provide insight about how a particular function-message transaction relates to other functions or to the overall program. Instead, the textual trace only displays the results of an individual function-message transaction. To understand how a particular function-message transaction affects the program, a programmer may wish to create a separate graphical representation of the trace by hand. Creating this graphical representation can be a time consuming task. Thus, there is a need in the art for a record of the program's execution, that displays both a textual trace and a graphical representation of the trace.

SUMMARY OF THE INVENTION

To overcome the limitations in the prior art described above, and to overcome other limitations that will become apparent upon reading and understanding the present specification, the present invention discloses a method, apparatus, and article of manufacture for a model trace view for object-oriented systems. The model trace view provides both a graphical trace view and a textual trace view of the execution of an object model within one window displayed on a monitor attached to a computer. Various execution and trace options may be selected from within the model trace view.

Various advantages and features of novelty which characterize the invention are pointed out with particularity in the claims annexed hereto and form a part hereof. However, for a better understanding of the invention and its advantages, reference should be made to the drawings which form a further part hereof, and to accompanying descriptive matter, in which there is illustrated and described specific examples in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Hardware Environment

Figure 1:
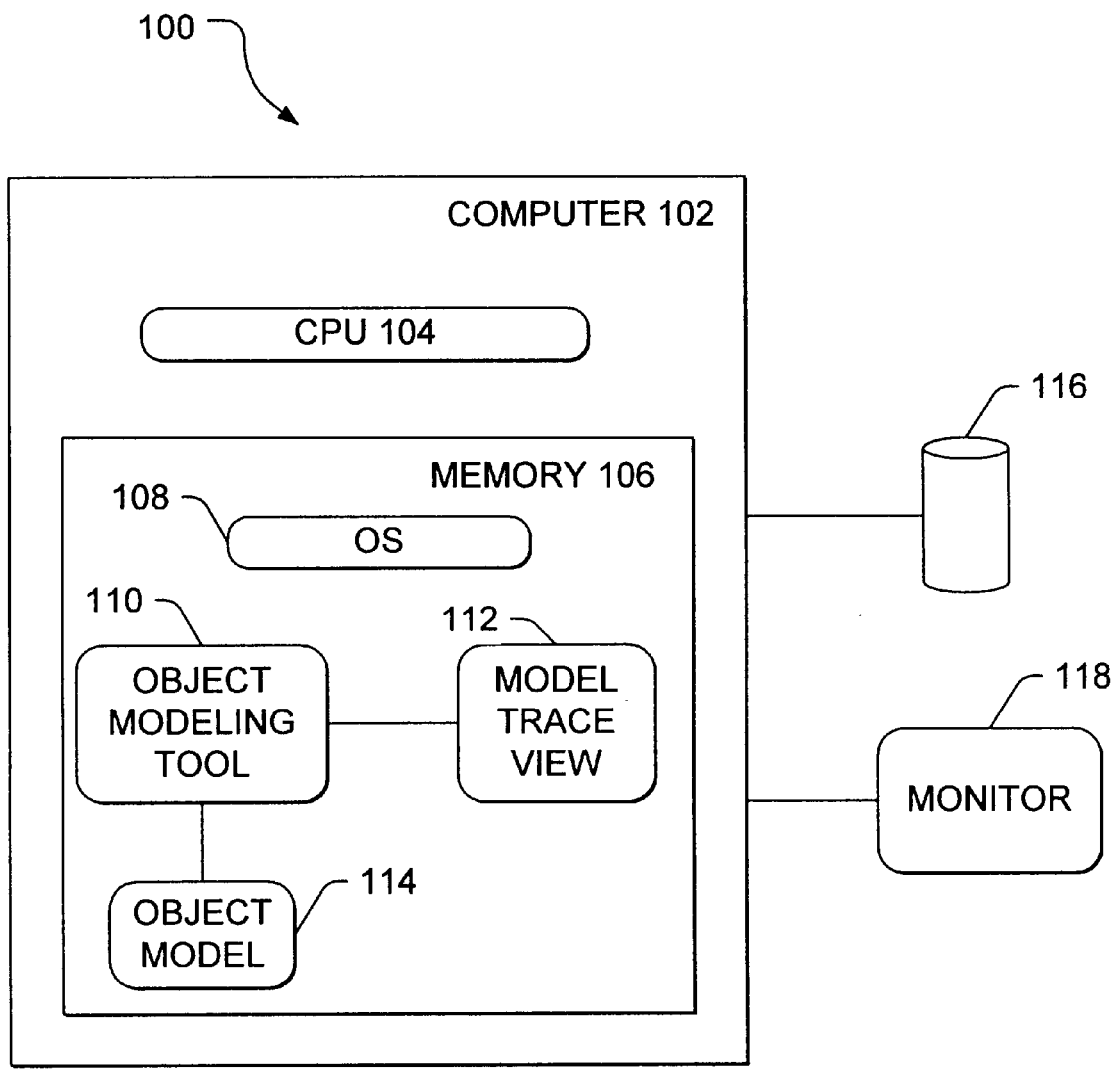
FIG. 1 illustrates an exemplary hardware environment that could be used to implement the present invention.

FIG. 1 illustrates an exemplary hardware environment 100 that could be used to implement the present invention. The hardware environment 100 includes a computer 102 that comprises a processor 104 and random access memory (RAM) 106. The computer 102 may be coupled to other devices, such as a monitor 118, a keyboard, a mouse device, a printer, etc. Of course, those skilled in the art will recognize that any combination of the above components, or any number of different components, peripherals, and other devices, may be used with the computer 102.

Generally, the computer 102 operates under control of an operating system 108 stored in the memory 106. The present invention is implemented by one or more data structures and computer programs that execute under the control of the operating system 108. More specifically, the present invention includes an object-oriented modeling tool 110 that generates a model trace view 112 from the execution of an object model 114.

In the preferred embodiment, the operating system 108, the object-oriented modeling tool 110, the model trace view 112, and the object model 114 are tangibly embodied in a computer-readable medium, e.g., data storage device 116, which could include one or more fixed or removable data storage devices, such as a removable cartridge drive, floppy disc drive, hard drive, CD-ROM drive, tape drive, etc. Further, the operating system 108, the object-oriented modeling tool 110, the model trace view 112, and the object model 114 are all comprised of instructions which, when read and executed by the computer 102, causes the computer 102 to perform the steps necessary to implement and/or use the present invention. Of course, those skilled in the art will recognize many modifications may be made to this configuration without departing from the scope of the present invention.

Model Trace View

The model trace view 112 is a graphical user interface that allows programmers to validate or debug the execution of the object model 114 by the object modeling tool 110. The model trace view 112 has three sections: a starting object/operation/argument selection section; a graphical trace view section; and a textual trace view section.

Figure 2A:
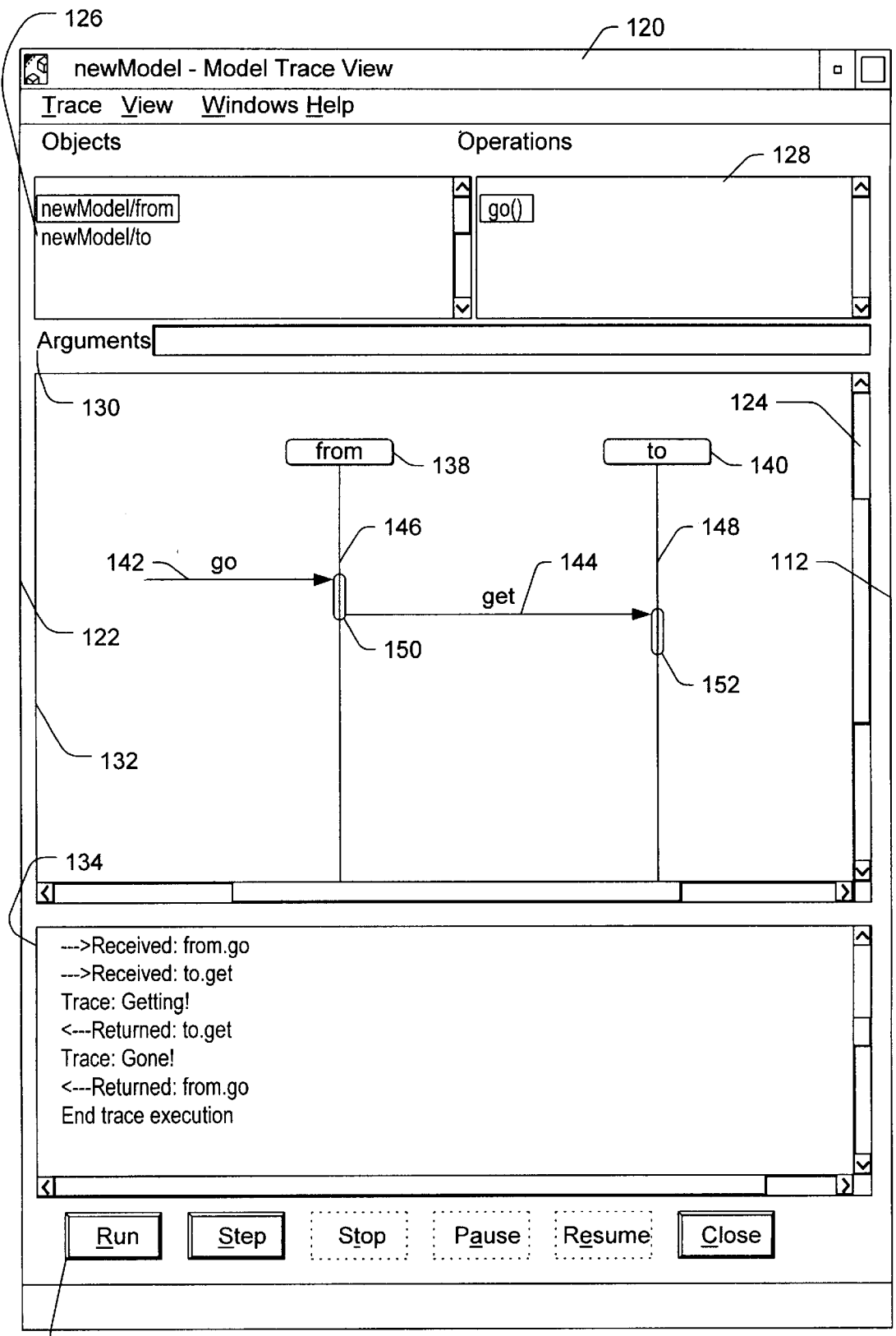
FIGS. 2A–2C illustrate a first example of the model trace view displayed on a monitor of the computer by the present invention.
Figure 2B:
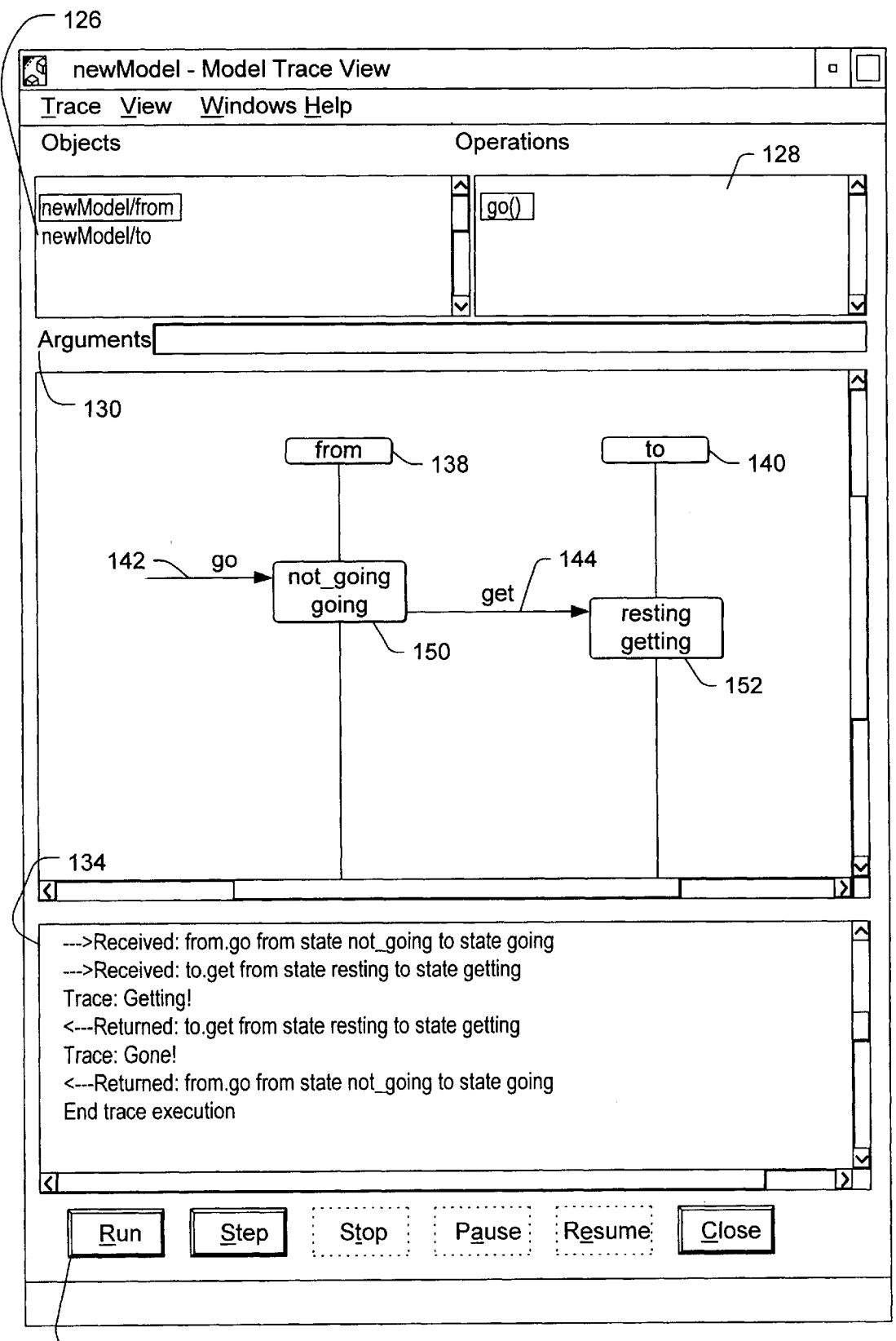
Figure 2C:
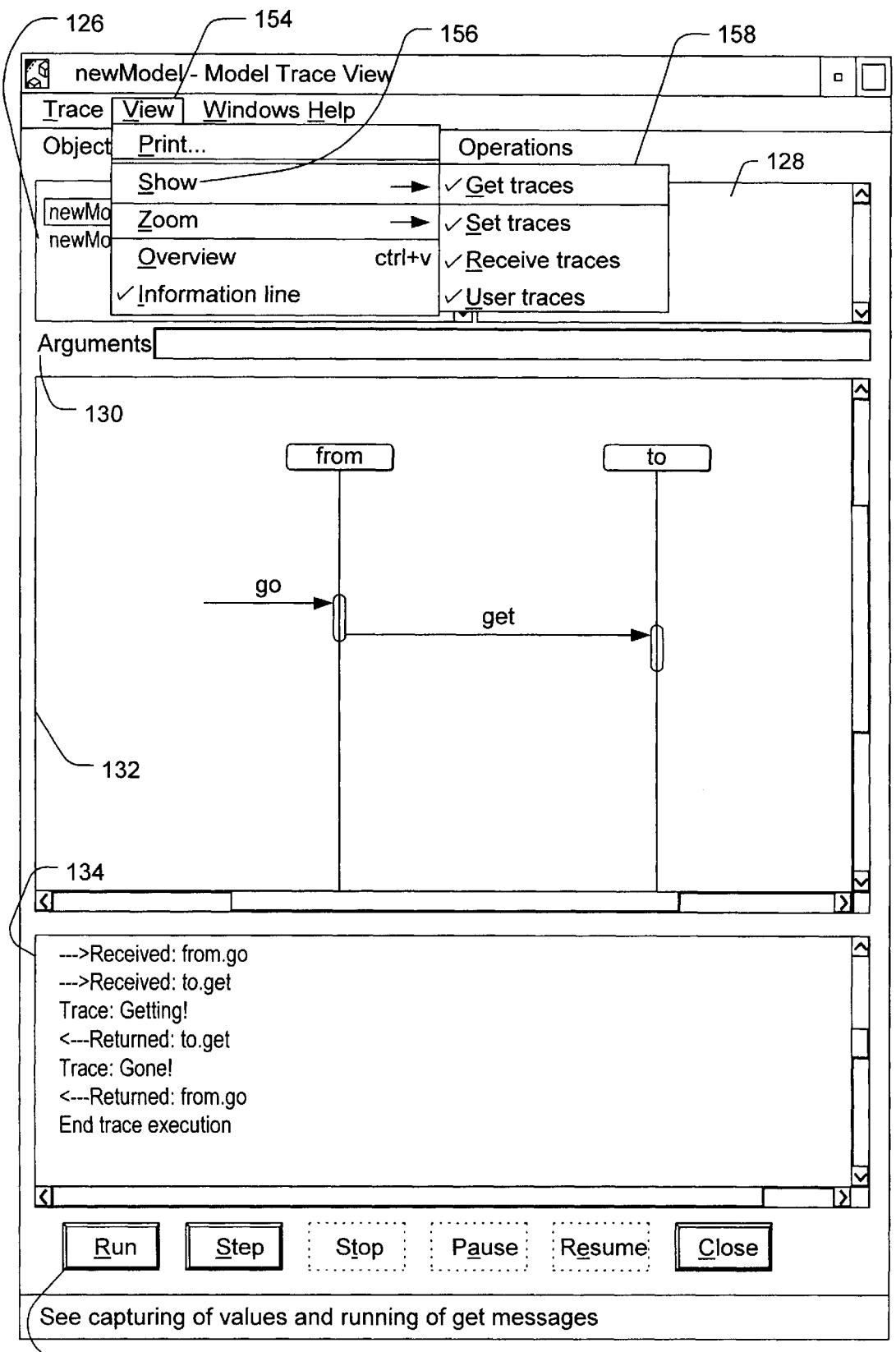

FIGS. 2A–2C illustrate a first example of the model trace view 112 displayed on the monitor 118 of the computer 102 by the present invention, wherein the model trace view 112 comprises a window having a plurality of panes therewithin. The model trace view 112 includes typical user interface mechanisms such as a title bar 120, border 122, and scroll bars 124. The panes comprise an objects list 126, an operations list 128, an argument entry field 130, a graphical trace view 132, and a textual trace view 134. The window also includes a plurality of command buttons 136.

In FIGS. 2A and 2B, the objects list 126 is displayed in a pane in the upper left corner of the window and is a list of all objects in the object model 114. For this example, the available objects are the "from" and "to" objects.

The operations list 128 is displayed in a pane in the upper right corner of the window and is a list of all operations for the object selected in the objects list 126. The operations list 128 is updated when a new object is selected in the objects list 126, or by any change to the list 126 via other views. In this example, the only available operation for the "from" object is the "go" operation.

The argument entry field 130 is an input field located immediately beneath the panes containing the objects list 126 and the operations list 128. The argument entry field 130 is the area where users can enter data that passes to an operation.

The graphical trace view 132 is displayed in a pane in the center portion of the window and is a graphical representation of the execution of the object model 114. Within the graphical trace view 132, visual elements include the shapes 138 and 140 labeled "from" and "to" that are objects in the object model 114, the horizontal arrows 142 and 144 that represent messages received by objects in the object model 114, the vertical bars 146 and 148 that represent a timeline, and the shapes 150 and 152 that represent state changes of the objects 138 and 140 in the object model 114, respectively.

FIG. 2B provides an example of the information available from the graphical trace view 132. A "go" message 142 is sent to the "from" object 138, thereby invoking the "go" operation for the "from" object 138. The "go" message 142 changes the current state 150 of the "from" object 138 from "not going" to "going." Within the "go" operation, the "from" object 138 sends a "get" message 144 to the "to" object 140, thereby invoking the "get" operation for the "to" object 140. The "get" message 144 changes the current state 152 of the "to" object 140 from "resting" to "getting."

The textual trace view 134 is displayed in a pane at the bottom of the window and is a textual trace of events that transpire during execution of the object model 114. The textual trace view 142 essentially provides a textual representation of the graphical trace view 132.

The textual trace view 134 includes a number of different types of textual elements, as described below:

Receive

The text "->Receive:<object>.<operation>" indicates that the object receives a message "operation".

The text "->Receive:<object>.<operation> from state <state1> to state <state2>" indicates that the object receives a message "operation" and change its current state from "state1" to "state2".

Return

The text "<-Returned:<object>.<operation>" or "<-Returned:<object>.<operation> from state <state1> to state <state2>" indicates that the message "operation" has been processed and is returned back to its sender.

Set

The text "Set:<object>.<attribute>-><value>" indicates that the object's attribute has been set to "value".

Get

The text "Get:<object>.<attribute><-<value>" indicates that the object's attribute value has been retrieved and has the indicated "value".

Trace

The text "Trace:<message>" shows the user trace message.

The text "End trace execution" indicates that execution has ended.

The present invention also provides filtering options for selectively filtering the textual representation of the textual trace view 134.

FIG. 2C provides an example of the mechanisms used to set filtering options for the textual trace view 134. Menu options are used to select filtering options for the textual trace view 134, wherein the filtering options are selected by: (1) selecting the VIEW menu item 154; (2) selecting the SHOW menu item 156; and (3) selecting one of the filtering options 158 displayed therein.

The filtering options 158 are described below:

Get Traces

This filtering option indicates that "Get:<object>:<attribute><--<value>" messages will be displayed.

Set Traces (Default Selection)

This filtering option indicates that "Set:<object>:<attribute>-><value>" messages will be displayed.

Receive Traces (Default Selection)

This filtering option indicates that "Received:" and "Returned:" messages will be displayed.

User Traces (Default Selection)

This filtering option indicates that "Trace:<message>" messages will be displayed.

Both the graphical trace view 132 and textual trace view 134 are displayed simultaneously in the window. Users can reallocate areas for the two panes by resizing the respective panes using any number of different techniques, which are well known in the art.

The command buttons 136 located at the bottom of the window are used to control execution of the object model 114. The command buttons 136 allow for the selection of the RUN, STEP, STOP, PAUSE, RESUME, and CLOSE functions.

The RUN function executes the object model 114 beginning from the selected starting object and starting operation through completion, without stopping. This function is most often chosen when the object model 114 has been validated.

The STEP function executes the object model 114 from the selected starting object and starting operation, but only one step at a time. The STEP function provides two types of execution, "stepping in" and "stepping over." During the "stepping in" execution, the computer 102 executes and displays the result of each line executed within the object model 114. During the "stepping over" execution, the computer 102 executes each line within a defined section of the object model 114 without displaying the result. This function is most often used during development and testing of the object model 114. During the step-by-step execution, the user can review the graphical trace view 132 and textual trace view 134 to determine the flow of execution, the values of attributes, the state changes of objects, and other information.

The STOP function terminates execution of the object model 114 at any time. The STOP function is invoked when termination of execution is desired with no intention of resuming execution. However, the contents of the graphical trace view 132 and textual trace view 134 are undisturbed.

The PAUSE and RESUME functions suspend and activate execution of the object model 114 at any time. These functions are invoked when suspension of execution of the object model 114 is desired with the intention of resuming execution at some point thereafter. Both the STOP and PAUSE functions are enabled after selection of either the RUN or STEP buttons. The RESUME function is enabled after selection of the PAUSE function.

To execute an object model 114, using the present invention, the user must perform the following steps:

1. In the objects list 126, select the starting object for execution of the object model 114;
2. In the operations list 128, select a starting operation for the selected starting object;
3. In the argument entry field 130, enter arguments, if any, to pass to the starting operation of the starting object; and
4. Select the RUN or STEP function from the command buttons 136 to start execution of the object model 114.

The CLOSE function terminates execution of the object model 114 and ends the display of the model trace view.

Figure 3:
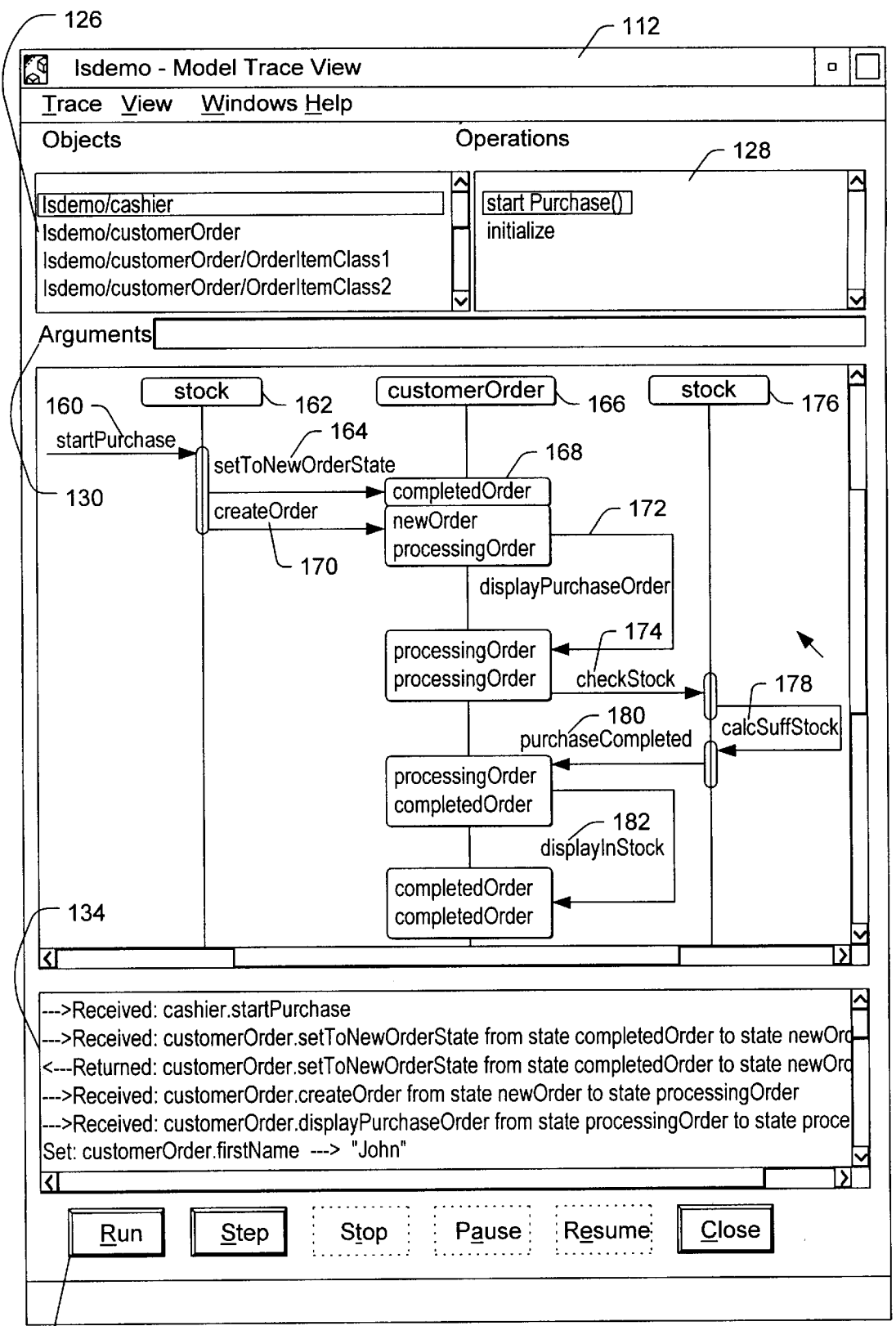
FIG. 3 illustrates a second example of the model trace view displayed on a monitor of the computer by the present invention.

FIG. 3 illustrates a second example of the model trace view 112 displayed on the monitor 118 of the computer 102 by the present invention. This example is titled "Lsdemo" model trace view. The "Lsdemo" model prompts for a customer's name, foreign currency type, and purchase amount in US dollars. The "Lsdemo" model then calculates and displays the amount of foreign currency the customer can purchase.

The available starting objects are shown in the objects list 126. To view the entire objects list 126, programmers may use the scroll bar to move up and down the objects list 126. FIG. 3 shows the starting objects "cashier" and "customerOrder," wherein the "cashier" object is selected as the starting object. As indicated in the operations list 128, the available operations for the "cashier" object are the "startPurchase" and "initialize" operations, wherein the "startPurchase" operation is selected as the starting operation.

In the graphical trace view 132, a "startPurchase" message 160 is sent to the "cashier" object 162 to invoke the "startPurchase" operation. Within the "startPurchase" operation, the "cashier" object 162 sends a "setToNewOrderState" message 164 to the "customerOrder" object 166 to invoke a "setToNewOrderState" operation. The "setToNewOrderState" operation changes the current state 168 of the "customerOrder" object 166 from "completedOrder" to "newOrder." Then, within the "startPurchase" operation, the "cashier" object 162 sends a "createOrder" message 170 to the "customerOrder" object 166 to invoke a "createOrder" operation. The "createOrder" operation changes the current state 140 of the "customerOrder" object 134 from "newOrder" to "processingOrder".

The "createOrder" operation also sends a "displayPurchaseOrder" message 172 to the "customerOrder" object 166 to invoke a "displayPurchaseOrder" operation. Within the "displayPurchaseOrder" operation, the "customerOrder" object 166 sets the customer's name, foreign currency type, and purchase amount as its attributes. The "displayPurchaseOrder" operation also determines if the specific foreign currency is in stock by sending a "checkStock" message 174 to the "stock" object 176 to invoke a "checkStock" operation.

The "checkStock" operation sends a "calcSuffStock" message 178 to the "stock" object 176 to invoke a "calcSuffStock" operation. The "calcSuffStock" operation calculates the foreign currency based upon the amount the customer wants to purchase and the known exchange rate. Then, the "calcSuffStock" operation sends a "purchaseCompleted" message 180 to the "customerOrder" object 166 to invoke a "purchaseCompleted" operation.

The "purchaseCompleted" operation decides if stock is sufficient by checking the argument passed in the message 180 and sends a "displayInStock" message 182 to the "stock" object 166 when the stock is sufficient. It also changes the current state 168 of the "customerOrder" object 166 from the "processingOrder" to "completedOrder."

The graphical trace view 132 displays a time-oriented trace of messages passed between objects and operations performed by objects, as well as information on the state transitions of the particular object. The textual trace view 134 supplements the graphical trace view 132 by providing additional details on the execution of the model 114.

Figure 4:
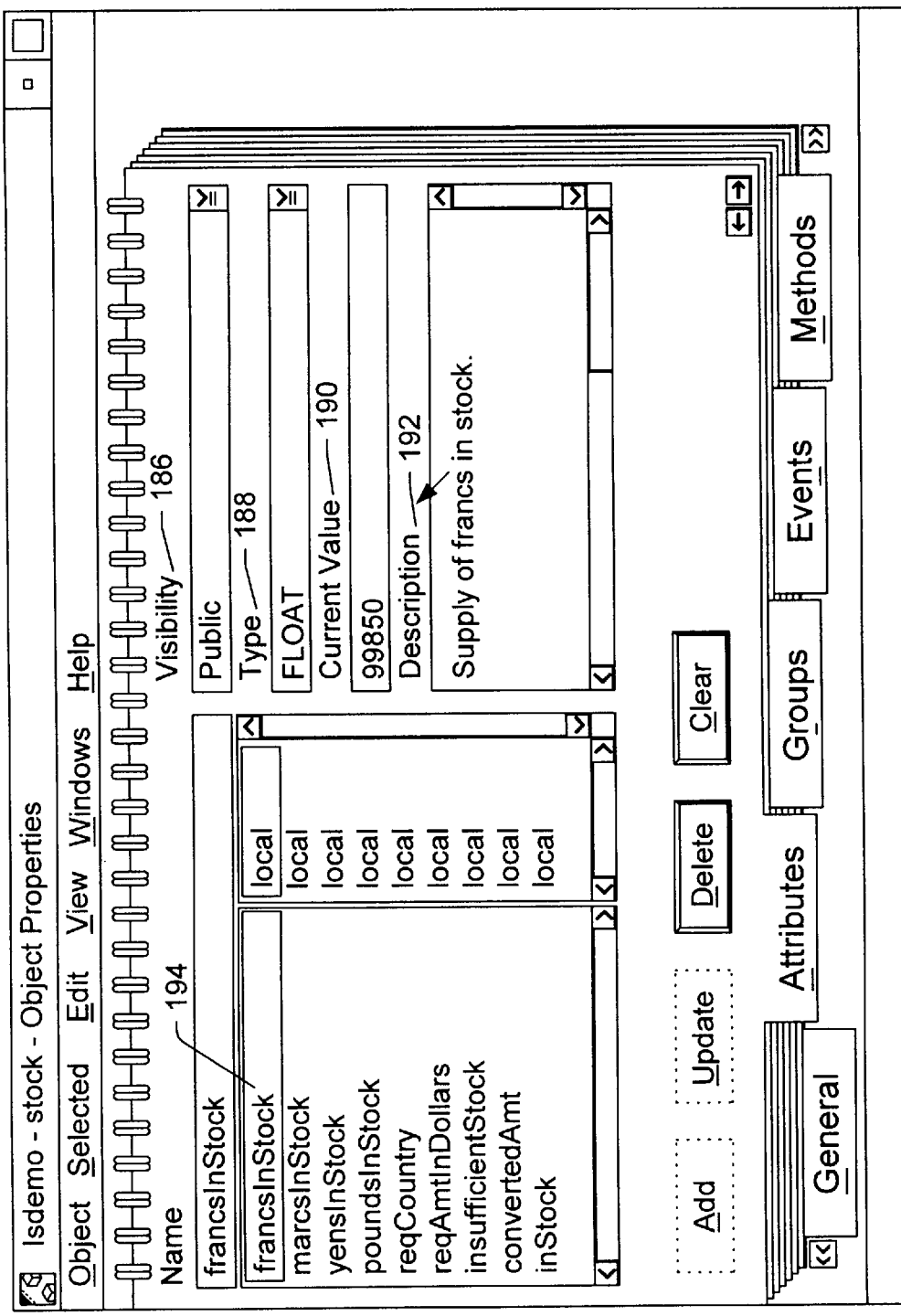
FIG. 4 illustrates an objects properties notebook displayed on the monitor of the computer by the present invention.

FIG. 4 illustrates an attributes window in an objects properties notebook 184 displayed on the monitor 118 of the computer 102 by the present invention. The objects properties notebook 184 can be displayed simultaneously with the model trace view 112 on the monitor 118 attached to the computer 102. Users can confirm the model 114 is executing correctly by checking the values stored in the object's attributes in the object properties notebook 184. This notebook 184 supplements both the graphical trace view 132 and textual trace view 134 by showing the values of an object's attributes, thereby allowing the user to confirm that the model 114 is executing correctly. An object's attributes include Visibility 186, Type 188, Current Value 190, and Description 192.

As an illustration, FIG. 4 shows the attributes of a "francsInStock" object 194. The Visibility 186 is public, the Type 188 is float, the Current Value 190 is 99850, and the Description 192 is Supply of francs in stock.

Flowcharts

Figure 5:
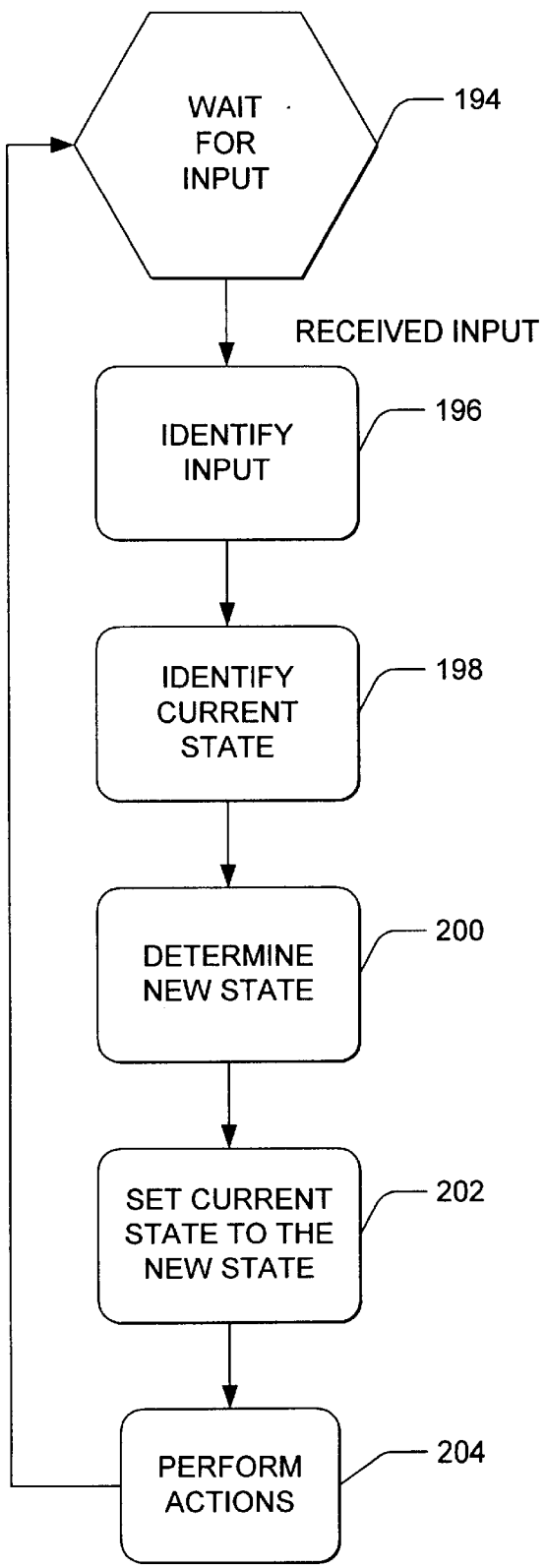
FIG. 5 is a flow chart that illustrates the general logic of the computer in performing the steps of the present invention.

FIG. 5 is a flow chart that illustrates the general logic of the computer 102 in performing the steps of the present invention, and more specifically, in displaying the model trace view 112 during execution of the object model 114 by the modeling tool 110. In the computer 102, operations are performed when transitions are made, based upon input events.

Block 194 represents the computer 102 waiting for an input event (e.g., a mouse button click). It should be appreciated that during this time, other system tasks, e.g., file, memory, and video tasks, etc., may also be carried out. When an input event occurs, control passes to block 196 to identify the input event. Based upon the input event, as well as the current state of the computer 102 determined in block 198, a new state is determined in block 200. In block 202, the current state is set to the previously determined new state. In block 204, the computer 102 performs any actions required for the transition, and control returns to block 194 to wait for more input events.

The specific operations that are performed by block 202 when transitioning between states will vary depending upon the current state and the input event. The various operations required to implement the present invention represent particular events handled by the computer 102. However, it should be appreciated that these events represent merely a subset of all of the events handled by the computer 102.

Figure 6:
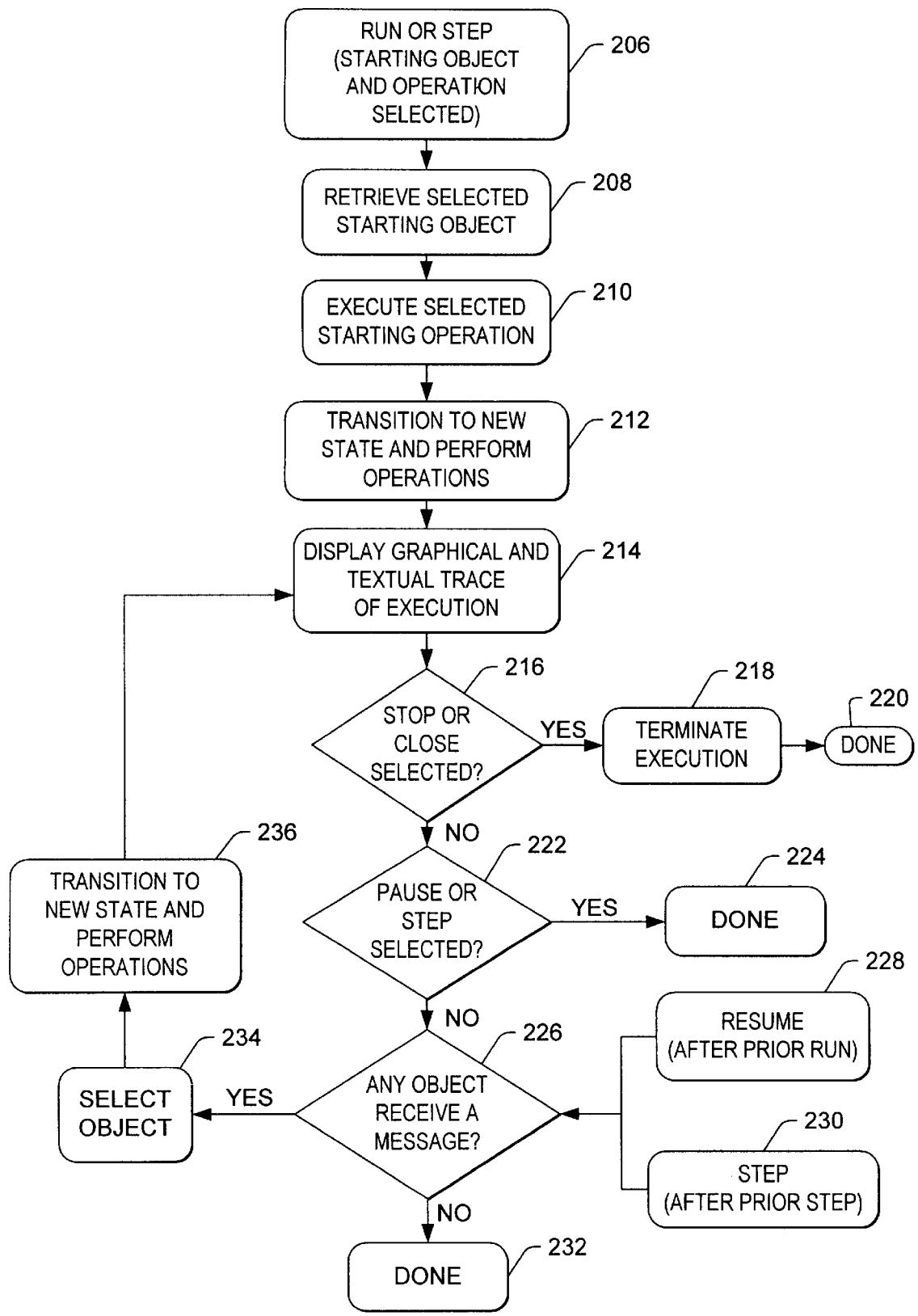
FIG. 6 is a flow chart that illustrates the general logic for the RUN, STEP, PAUSE, RESUME, STOP, and CLOSE functions (starting object and operation selected) according to the present invention.

FIG. 6 is a flow chart that illustrates the general logic for the RUN, STEP, PAUSE, RESUME, STOP, and CLOSE functions according to the present invention. In this flowchart, the various entry blocks indicate the associated state and particular input event in parentheses. It is assumed for the purposes of this flowchart that the model trace view 112 has been displayed, that the user has selected the starting object and starting operation therefrom, and that the user has selected one of the above-identified functions.

Block 206 is an entry block that indicates that a Run or Step function has been invoked after a starting object and starting operation has been selected.

Block 208 represents the computer 102 retrieving the selected starting object and starting operation from the object model 114. Block 210 represents the computer 102 executing the selected starting operation. Block 212 represents the computer 102 transitioning to the new state for the selected object and performing any operations of the selected object. Block 214 represents the computer 102 displaying the model trace view, i.e., displaying the graphical trace view 132 and textual trace view 134, of the execution of the object model 114. Block 216 is a decision block that represents the computer 102 determining whether a Stop or Close function has been selected. If so, control transfers to Block 218 which terminates execution of the object model and Block 220 which completes the logic of FIG. 6. Otherwise, control is transferred to Block 222, which is a decision block that represents the computer 102 determining whether a PAUSE or STEP function has been selected. If so, control transfers to Block 224, which completes the logic of FIG. 6. Otherwise, control transfers to Block 226, which is a decision block that represents computer 102 determining whether any object in the object model 114 has received a message as a result of the execution of the object model 114. Block 226 is also the first block executed for the entry points for the RESUME (after prior RUN) and STOP (after prior STEP) functions have been invoked. If not, control is transferred to Block 232, which completes the logic of FIG. 6. Otherwise, control is transferred to Block 234, which represents the computer 102 selecting one of the objects that received a message from the object model 114. Block 236 represents the computer 102 transitioning to the new state for the selected object and performing any operations of the selected object associated with the received message.

Conclusion

This concludes the description of the preferred embodiment of the invention. The present invention discloses a method, apparatus, and article of manufacture for a model trace view for object-oriented systems. The model trace view provides both a graphical trace view and a text trace view of the execution of an object model within one window displayed on a monitor attached to a computer. Various execution and trace options may be selected from within the model trace view.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed:

1. A method for displaying an execution trace of an object model on a monitor connected to a computer, comprising the steps of:
    executing the object model in the computer; and
    displaying a model trace view for the execution of the object model on the monitor attached to the computer, wherein the model trace view includes a graphical trace view for displaying a graphical representation of the execution of the object model and a textual trace view for displaying a textual representation of the execution of the object model.

2. The method of claim 1 above, wherein the model trace view includes an object list of all objects within the object model.

3. The method of claim 2 above, wherein the model trace view includes an operations list of all operations for a selected object in the object list.

4. The method of claim 3 above, further comprising the step of selecting a starting object for the execution of the object model from the objects list.

5. The method of claim 4 above, further comprising the step of selecting a starting operation for the selected starting object from the operations list.

6. The method of claim 5 above, wherein the model trace view includes an argument entry field for entering data to pass to a selected starting operation in the operations list.

7. The method of claim 1 above, wherein the graphical representation comprises one or more visual elements selected from a group comprising objects in the object model, state changes of the objects in the object model, messages sent and received by the objects in the object model.

8. The method of claim 1 above, wherein the textual representation comprises one or more textual elements selected from a group comprising objects in the object model, state changes of the objects in the object model, messages received by the objects in the object model, messages returned by the objects in the object model, attribute values set in the objects in the object model, attribute values retrieved in the objects in the object model, user trace entries, and pausing, resuming, ending, and stopping execution messages.

9. The method of claim 8, further comprising the step of selectively filtering the textual representation of the execution of the model by selecting textual elements to display.

10. The method of claim 1 above, wherein the step of executing comprises the step of executing the object model in a step mode.

11. The method of claim 10 above, wherein the step mode includes both stepping in and stepping over, stepping in being the computer displaying the result of each line executed in the object model and stepping over being the computer executing each line in a defined section of the object model without displaying it.

12. The method of claim 1 above, wherein the step of executing comprises the step of executing the object model in a run mode.

13. The method of claim 1 above, further comprising the step of pausing the execution of the object model.

14. The method of claim 13 above, further comprising the step of resuming the paused execution of the object model.

15. The method of claim 1 above, further comprising the step of stopping the execution of the object model.

16. The method of claim 1 above, further comprising the step of closing the model trace view.

17. The method of claim 1 above, wherein both the graphical trace view and the textual trace view can be resized.

18. An apparatus for displaying an execution trace of an object model, comprising:
   a computer having a monitor connected thereto;
   means, performed by the computer, for executing the object model; and
   means, performed by the computer, for displaying a model trace view for the execution of the object model on the monitor attached to the computer, wherein the model trace view includes a graphical trace view for displaying a graphical representation of the execution of the object model and a textual trace view for displaying a textual representation of the execution of the object model.

19. The apparatus of claim 18 above, wherein the model trace view includes an object list of all objects within the object model.

20. The apparatus of claim 19 above, wherein the model trace view includes an operations list of all operations for a selected object in the object list.

21. The apparatus of claim 20 above, further comprising means for selecting a starting object for the execution of the object model from the objects list.

22. The apparatus of claim 21 above, further comprising means for selecting a starting operation for the selected starting object from the operations list.

23. The apparatus of claim 22 above, wherein the model trace view includes an argument entry field for entering data to pass to a selected starting operation in the operations list.

24. The apparatus of claim 18 above, wherein the graphical representation comprises one or more visual elements selected from a group comprising objects in the object model, state changes of the objects in the object model, messages sent and received by the objects in the object model.

25. The apparatus of claim 18 above, wherein the textual representation comprises one or more textual elements selected from a group comprising objects in the object model, state changes of the objects in the object model, messages received by the objects in the object model, messages returned by the objects in the object model, attribute values set in the objects in the object model, attribute values retrieved in the objects in the object model, user trace entries, and pausing, resuming, ending, and stopping execution messages.

26. The apparatus of claim 25, further comprising means for selectively filtering the textual representation of the execution of the model by selecting textual elements to display.

27. The apparatus of claim 18 above, wherein means for executing comprises means for executing the object model in a step mode.

28. The apparatus of claim 27 above, wherein the step mode includes both stepping in and stepping over, stepping in being the computer displaying the result of each line executed in the object model and stepping over being the computer executing each line in a defined section of the object model without displaying it.

29. The apparatus of claim 18 above, wherein means for executing comprises means for executing the object model in a run mode.

30. The apparatus of claim 18 above, further comprising means for pausing the execution of the object model.

31. The apparatus of claim 30 above, further comprising means for resuming the paused execution of the object model.

32. The apparatus of claim 18 above, further comprising means for stopping the execution of the object model.

33. The apparatus of claim 18 above, further comprising means for closing the model trace view.

34. The apparatus of claim 18 above, wherein both the graphical trace view and the textual trace view can be resized.

35. An article of manufacture comprising a program storage medium readable by a computer and tangibly embodying one or more instructions executable by the computer to perform method steps for displaying an execution trace of an object model on a monitor connected to the computer, the method comprising the steps of:

executing the object model in the computer; and displaying a model trace view for the execution of the object model on the monitor attached to the computer, wherein the model trace view includes a graphical trace view for displaying a graphical representation of the execution of the object model, a textual trace view for displaying a textual representation of the execution of the object model, and a means of controlling the execution.

36. The method of claim 35 above, wherein the model trace view includes an object list of all objects within the object model.

37. The method of claim 36 above, wherein the model trace view includes an operations list of all operations for a selected object in the object list.

38. The method of claim 37 above, further comprising the step of selecting a starting object for the execution of the object model from the objects list.

39. The method of claim 38 above, further comprising the step of selecting a starting operation for the selected starting object from the operations list.

40. The method of claim 39 above, wherein the model trace view includes an argument entry field for entering data to pass to a selected starting operation in the operations list.

41. The method of claim 19 above, wherein the graphical representation comprises one or more visual elements selected from a group comprising objects in the object model, state changes of the objects in the object model, messages sent and received by the objects in the object model.

42. The method of claim 19 above, wherein the textual representation comprises one or more textual elements selected from a group comprising objects in the object model, state changes of the objects in the object model, messages received by the objects in the object model, messages returned by the objects in the object model, attribute values set in the objects in the object model, attribute values retrieved in the objects in the object model, user trace entries, and pausing, resuming, ending, and stopping execution messages.

43. The method of claim 42, further comprising the step of selectively filtering the textual representation of the execution of the model by selecting textual elements to display.

44. The method of claim 19 above, wherein the step of executing comprises the step of executing the object model in a step mode.

45. The method of claim 44 above, wherein the step mode includes both stepping in and stepping over, stepping in being the computer displaying the result of each line executed in the object model and stepping over being the computer executing each line in a defined section of the object model without displaying it.

46. The method of claim 19 above, wherein the step of executing comprises the step of executing the object model in a run mode.

47. The method of claim 19 above, further comprising the step of pausing the execution of the object model.

48. The method of claim 47 above, further comprising the step of resuming the paused execution of the object model.

49. The method of claim 19 above, further comprising the step of stopping the execution of the object model.

50. The method of claim 19 above, further comprising the step of closing the model trace view.

51. The method of claim 19 above, wherein both the graphical trace view and the textual trace view can be resized.

\* \* \* \* \*

UNITED STATES PATENT AND TRADEMARK OFFICE
CERTIFICATE OF CORRECTION

PATENT NO. : 5,960,199
DATED : September 28, 1999
INVENTOR(S) : Stephen Andrew Brodsky et al.

It is certified that error appears in the above-identified patent and that said Letters Patent is hereby corrected as shown below:

Column 11, line 25, "19" should read --35--.

Column 11, line 31, "19" should read --35--.

Column 12, line 10, "19" should read --35--.

Column 12, line 19, "19" should read --35--.

Column 12, line 22, "19" should read --35--.

Column 12, line 26, "19" should read --35--.

Column 12, line 28, "19" should read --35--.

Column 12, line 30, "19" should read --35--.

Signed and Sealed this

Seventeenth Day of April, 2001

*Attest:*

NICHOLAS P. GODICI

*Attesting Officer*    Acting Director of the United States Patent and Trademark Office